April 12, 1966    B. CORNELISON    3,245,263
GRAVITY METER SUSPENSION SYSTEM
Filed July 15, 1963    3 Sheets-Sheet 1
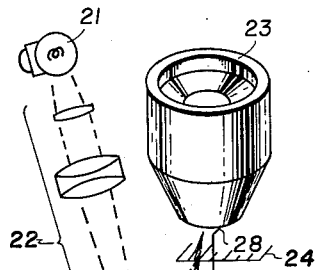
FIG. 1
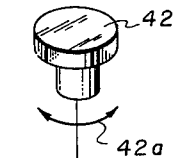
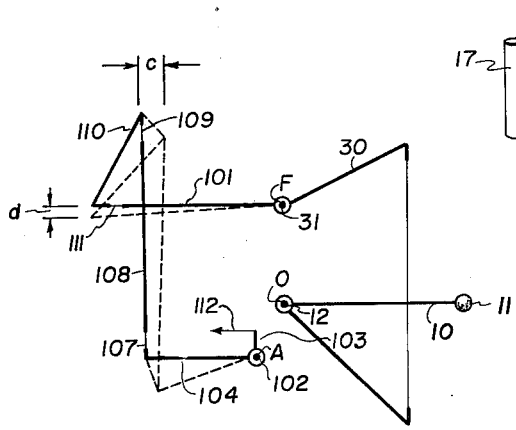
FIG. 6
FIG. 7
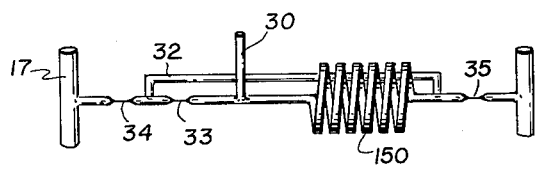
BOYD CORNELISON
INVENTOR.
BY  
ATTORNEY April 12, 1966   B. CORNELISON   3,245,263
GRAVITY METER SUSPENSION SYSTEM
Filed July 15, 1963   3 Sheets-Sheet 2

BOYD CORNELISON
INVENTOR.
BY *D. Care Richards*
ATTORNEY

BOYD CORNELISON
INVENTOR.
BY D. Carl Richards
ATTORNEY

United States Patent Office 3,245,263
Patented Apr. 12, 1966

3,245,263
GRAVITY METER SUSPENSION SYSTEM
Boyd Cornelison, Dallas, Tex., assignor to Texas Instruments Incorporated, Dallas, Tex., a corporation of Delaware
Filed July 15, 1963, Ser. No. 294,842
19 Claims. (Cl. 73—383)

This invention relates to force sensitive devices and more particularly to improved suspension systems.

In gravity meters of the type represented by Patent No. 2,607,487 to Worden, a weight is disposed at one end of a horizontal arm. The other end of the arm is rotatably secured to a support. The weight arm is maintained at a reference position by a mainspring. Mainsprings of the prior art have been characterized by having one end directly or indirectly secured to the weight arm and the other end secured to the end of a second support arm. The support arm is pivotally secured to the frame of the instrument and a system of helical springs generally is employed to apply forces to the support arm. In such systems, the support arm is connected to one end of a helical mainspring, the other end of which is connected to the weight arm. The support arm does not respond in any way to gravity changes. Variations in gravity as between two observation stations cause displacements of the weight arm. Measurements of such variations, in general, are made by observation of the change in a spring element required to restore the weight arm to a null point at which the weight arm has been returned to a horizontal position.

Since most materials are subject to physical changes with changes in temperature, considerable effort has been spent upon the problem of eliminating from gravity meters undesirable drift or errors due to variations in temperature. More particularly, metallic elements have been incorporated in conjunction with quartz elements in a common suspension system whereby a measure of temperature compensation has been achieved. Quartz has been found to provide a basic structural material of most favorable characteristics. However, there has remained the desirability of an improved suspension in which unwanted variables, such as are caused by "quartz to metal" seals, inherent in prior systems are eliminated or are completely compensated.

It is therefore, an object of the present invention to provide a gravity meter in which a new mechanical system provides for minimal variation in the effective geometric relationship between suspension elements for a given change in gravitational force applied thereto. A further object of the invention is to provide a system which, by reason of adiabatic expansion of gases confined within and without suspension elements is, in effect, insensitive to temperature.

A further object of the invention is to provide a gravity meter suspension in which a torsion fiber is employed as a mainspring or astatizing means in the gravity sensor system. A further object is to provide a gravity meter in which force from a torsion fiber is employed for nulling or returning the gravity sensitive mass to a reference point and to provide such system with a means for adjusting its linearity.

More particularly, in accordance with the present invention there is provided a gravity sensitive system including a weight and a torque arm attached to the weight by a filament extending from a first point on the torque arm to the weight. A resilient member having symmetry relative to an axis passing transversely through the torque arm at a second point spaced from the first point is rigidly secured to the torque arm at the second point to apply a torque to the torque arm to support a weight arm. A linkage coupled to the resilient member at a point thereon spaced from the torque arm connection is provided for varying the torque in the system to vary the position of the weight and weight arm.

Preferably the system includes a first axle hinged for rotation about a horizontal axis. A weight arm extends horizontally from the axle. A second suspension includes a second horizontally disposed axial support parallel to the axis of the axle and includes a yoke structure for spanning an intermediate portion of the second suspension. A resilient mainspring preferably in the form of a hollow twisted torsion fiber is rigidly secured at one end to the yoke structure and extends along the second axis. A torque arm is secured to and extends from the mainspring opposite the rigid yoke coupling. A physical connection extends between the end of the torque arm and the first suspension for supporting the weight arm. Means are provided for rotating the yoke about the second axis to vary the torque on the torque arm by the resilient means to control the position of the weight arm.

In a further aspect of the invention, a third system is provided including an axially symmetrical resilient means for compensating undesirable physical variations in a mainspring compensator which is connected to the torque arm to apply a torque thereto.

For a more complete understanding of the present invention and for further objects and advantages thereof, reference may now be had to the following description taken in conjunction with the accompanying drawings in which:

FIGURE 1 illustrates a gravity meter suspension having a torsion mainspring;

FIGURE 6 is a diagrammatic view of the embodiment of FIGURE 5; and

FIGURE 7 illustrates a modified form of spring system.

Figure 2:
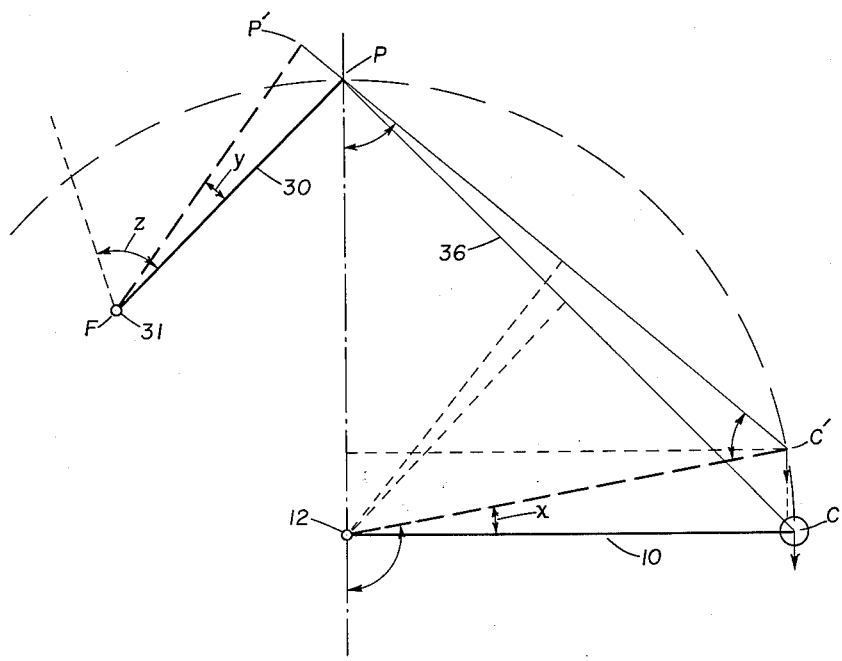
FIGURE 2 is a diagram illustrating the geometry of the system of FIGURE 1.

Referring now to FIGURE 1, there is illustrated a schematic representation of a gravity meter embodying the present invention. The gravity meter suspension is formed entirely out of fused quartz. Thus, there may be eliminated the problem of sealing metal to quartz as in the prior art systems. Furthermore, the system is sufficiently rugged to withstand substantial abuse. Involved in the system of FIGURE 1 is a new geometrical relationship between the suspension components. Also provided is a new mode of applying a restoring or nulling force to a gravity sensitive element.

More particularly, a weight arm 10 forms a part of a gravity responsive weight represented by the weight 11. The arm 10 is cantilever-mounted on a horizontal axle 12. The arm extends perpendicularly and horizontally from the axle 12. The axle 12 is an elongated rigid rod of fused quartz coupled at the ends thereof by way of frictionless low-torque hinges 13 and 4 to posts 15 and 16, respectively. The posts 15 and 16 form portions of a yoke, which yoke is supported from a main frame 17. The hinges 13 and 14 form a set of frictionless hinges which permit almost unlimited rotation of the axle 12 and arm 10.

Weight arm 10 normally is supported at a reference position which may be noted by viewing the position of an indicating arm 20 extending upwardly from axle 12. A readout system includes a light source 21, an optical system 22, and an eye piece 23. The readout system is provided to observe the horizontal bar 28 on the indicator arm 20. A scale member 24 is provided in the optical system as a reference for null measurement of arm 10. Arm 10 is supported by a torque arm 30. Torque arm 30 is rigidly attached to a torsion fiber mainspring 31. The torsion fiber mainspring 31 is rigidly anchored at one end to a yoke 32. Mainspring 31 supports torque arm 30 at an intermediate point with the other end of mainspring 31 being supported by the yoke 32 through a hinge 33. This mounting system permits differential rotation of the opposite ends of mainspring 31. Yoke 32 is hinged to the main frame 17 by hinges 34 and 35. Thus, the yoke 32 may be rotated relative to the main frame to vary the force on the torque arm 30. The end of torque arm 30 is coupled to weight arm 10 by a fine quartz tensile filament 36.

Yoke 32 is provided with a downwardly extending arm 40 which is coupled by a filament 41 to a nulling linkage. The nulling linkage includes a control element 42 connected by way of a torsion fiber 43 to a crank arm 44. The crank arm 44 is connected by means of a rod 45 to a bar 46 which is hinged at points 47 and 48 to frame 49 which is part of the main frame 17. The extension of arm 45 beyond arm 46 serves as counterbalance for the crank arm 44.

Unique features of the suspension geometry of the system of FIGURE 1 are portrayed in FIGURE 2. Arm 30, of length L, is illustrated as extending upward and to the right at a 45° angle from the axis of mainspring 31. Mainspring 31 is positioned above and to the left of the axle 12. The filament 36 preferably is equal in length to about twice the length of the torque arm 30. Torque arm 30 extends toward a vertical plane passing through axle 12. This geometry is preferred because of the action of such suspension when deflections are encountered. Weight arm 10 and torque arm 30 are shown dotted in unbalance position in FIGURE 2. Such unbalance is caused by a decrease in gravity, causing the arm 10 to rotate counterclockwise as through a small angle $x$. A corresponding angle $y$ represents the rotation of the torque arm 30.

Assume at equilibrium that the torque exerted on the mainspring 31 initially twists it through an angle $z$ to exert a force through arm 30 and filament 36 sufficient to support the weight of arm 10 in a horizontal position. The sum of the torques about the axle 12 is thus zero. The geometry in this suspension is so chosen that upon rotation of arm 10, angles $x$ and $y$ are almost equal. For all required angles, a line connecting the ends of the weight arm 10 and the torque arm 30 will pass through the point P which is the equilibrium position for the end of torque arm 30. The filament 36, of course, is of constant length. As weight arm 10 moves on angle $x$, the end of the torque arm 30 likewise moves through essentially equal angle $y$. Thus, rotation of weight arm 10 is proportional to the change in torque exerted by mainspring 31. This is also proportional to the distance through which the end of torque arm 30 has moved.

As point C on the weight arm 10 moves to point C', point P on the torque arm 30 moves to point P'. Rotation of weight arm 10 is proportional to the change in torque exerted by mainspring 31 and is likewise proportional to the distance PP'. The filament 36 extending from point P' to C' passes through point P. The rotation of weight arm 10 is proportional to the distance PP'. The distance PC equals both the distance P'C' and the filament which preferably is of length 2L. It follows from such relationship that the rotation of weight arm 10 is proportional to the change in length of the distance PC'. In other words, filament 36, having length PC, effectively changes its length as the force along it due to the torque in the mainspring 31 changes. This is true from a practical standpoint over a range far more than is sufficient for operation of the instrument since the filament 36 will pass through point P for a considerable range of the angle $x$. Therefore, the filament 36 can be treated analytically as a resilient member with its origin at point P with the force exerted along it being directly proportional to the length from point P to the point C' where point C' lies on a circle whose center is at axle 12 and whose radius is the distance OC. In other words, the tensile fiber 36 has an apparent change in length as the force along it due to the torsion fiber 31 changes. The fiber 36, of course, does not actually change length, but, within the range of operation, always passes through point P so that an apparent change is present. The system, therefore, appears to operate as a spring, but there is no material change in the geometrical relationship which would introduce undesirable force components.

In this system, with the geometry as above described, it can be shown that the period of the suspension can be made to be infinite. In any gravity meter it is not necessary that the period of the system be infinite. It is only required that it be very long; for example, of the order of about 10 seconds, without the system becoming unstable at any point within its allowable excursion.

The locus of the junction between the torque arm 30 and the filament 36 is such that a line coinciding with the filament 36 always passes through point P for angles as great as one or two magnitudes above any angular displacement encountered in actual use of the system. In practice, the angles $x$ and $y$ will ordinarily be limited to not more than 1°, whereas substantial coincidence between a line coinciding with the filament 36 and point P will be maintained where the angle $x$ is as great as about 20°.

While the geometry of FIGURES 1 and 2 embodies the case where the axis of the mainspring 31 is displaced horizontally as well a vertically from the axle 12, it will be hereinafter shown that different relationships may be maintained while retaining the desirable features of the operation embodied in the system of FIGURES 1 and 2.

Figure 3:
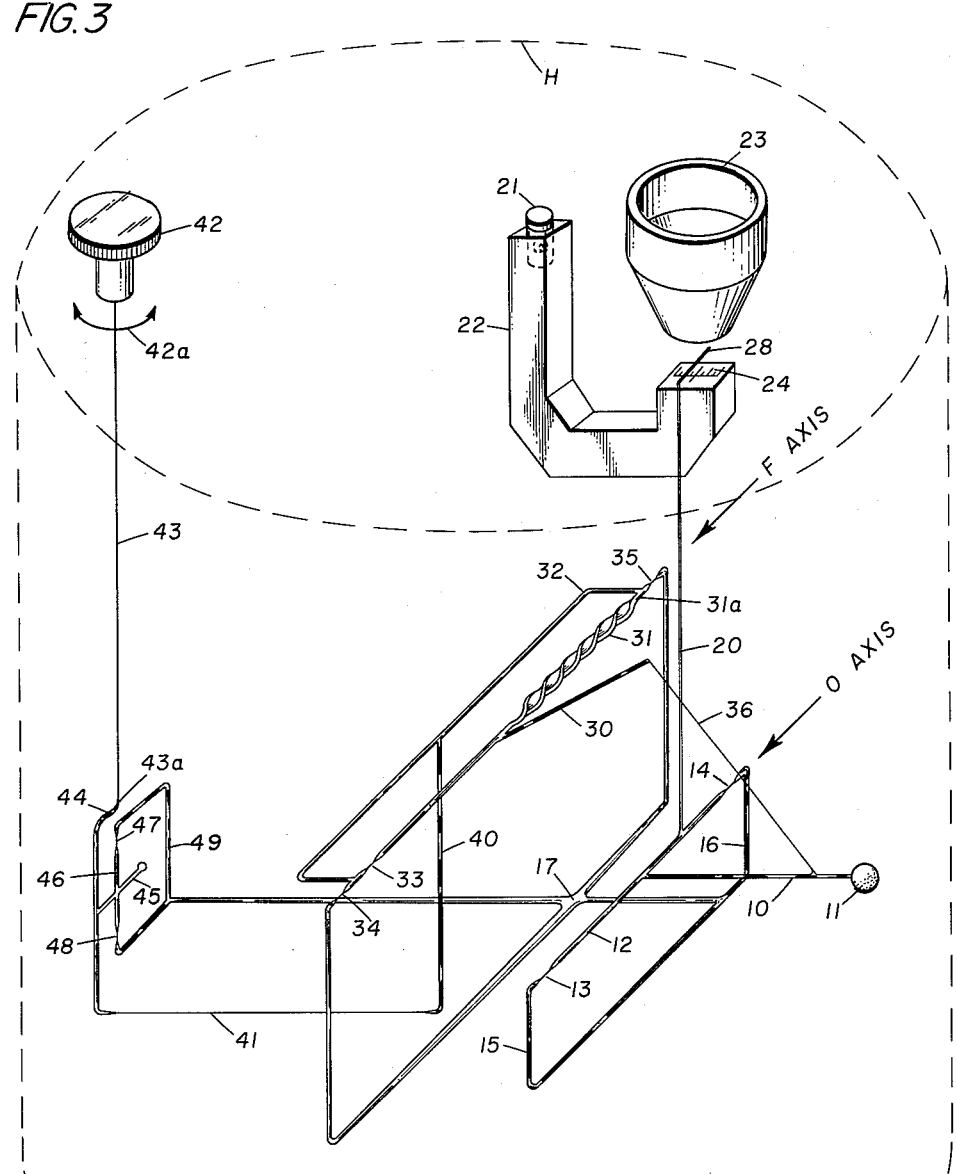
FIGURE 3 illustrates a modification of the system of FIGURE 1 in which the mainspring is temperature compensated.

When the system of FIGURE 1 is operated in an atmosphere in which temperature changes, the force exerted by the mainspring 31 will vary somewhat with temperature. There are a number of different means known in the art for temperature compensation of a suspension such as shown in FIGURE 1. However, a new and unique compensation means for this suspension is embodied in the system of FIGURE 3 where like elements have been given the same reference characters as in FIGURE 1. In FIGURE 3, the mainspring 31 is a hollow, twisted rectangular tube. The mainspring 31 is gas-filled for temperature compensation.

In this embodiment, the section of mainspring 31 lying between the torque arm 30 and the hinge 35 is a twisted rectangular tube. The tube is shown in enlarged sectional view in FIGURE 4. The mainspring 31 where hollow has thin walls and is closed on each of the ends as to serve as a chamber for a gas. Pressure changes in the gas, at a pressure initially different from that of the atmosphere exterior to the mainspring, compensate for temperature dependent changes in the force applied to the torque arm. In this embodiment, the structural relationships are the same as in FIGURE 1, except for the inclusion of means for temperature compensation. The twisted section of the mainspring 31 is formed by twisting a rectangular tube while it is heated. With this configuration and with gas sealed inside the mainspring, an increase in pressure due to an increase in temperature will cause the mainspring to unwind. It is this change in the configuration brought about by a temperature change which is employed in the embodiment of FIGURE 3 for compensating for temperature variations.

Figure 4:
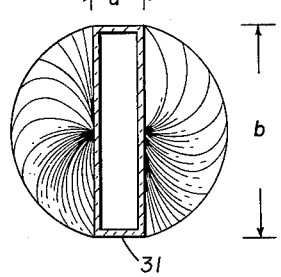
FIGURE 4 is a cross-sectional view of the torsion fiber.

It will be noted that the mainspring 31 of FIGURE 4 as embodied in the suspension of FIGURE 3 has symmetry relative to the filament axis F. Further, torque arm 30 is secured to the free end of the mainspring 31 at the F axis. Torsional forces only are thus transmitted by way of torque arm 30 and the filament 36 to weight arm 10. The "free end" of the mainspring 31 is supported by the hinge 33 to permit rotational movement relative to yoke 32. In contrast, the end 31a of the mainspring 31 is rigidly secured to yoke 32.

In practice, the mainspring 31 is initially filled with gas to have a differential pressure relative to the environment in which the system is to operate. Preferably, the pressure of dry gas in the mainspring exceeds the pressure outside the same. By this means, a change in temperature in the environment will be reflected by a change in temperature of the quartz fiber mainspring itself and at the same time there will be involved a change in the temperature in the contained gas which will cause a change in pressure in the mainspring. Mainspring 31, in accordance with the present invention, is so wound that the change in pressure due to adiabatic expansion of the gas therein will produce a force which will compensate any change in the strength or length of the mainspring by reason of the change in its temperature. Since the compensating element, namely, the gas which changes the pressure inside the mainspring 31, is at the same physical location as the spring itself, there will be avoided a time lag which has plagued temperature compensating systems of the prior art where the compensating element is spaced from the element to be compensated.

Manual control of the nulling systems of FIGURES 1 and 3 is readily accomplished by rotating yoke 32 to twist the base of mainspring 31 to vary the position of arm 30. This linkage avoids problems in prior art systems where a mainspring is varied in length to change the force transmitted to the weight arm. In such prior art systems, the change in the mainspring length is, in fact, a basic change in the geometry of the suspension. Such changes in geometry are most undesirable since they are unavoidably accompanied by changes in system sensitivity and in the calibration of the suspension.

In accordance with the present invention, the nulling force is applied to the yoke 32 by way of the torsion fiber 43, while maintaining the geometry of the system and thus without change in the sensitivity and calibration. The control knob 42 is to be mounted on the suspension housing with the fiber 43 extending essentially vertically downward to a coupling 43a on a crank arm 44. Rotation of the knob 42 as indicated by arrow 42a will cause the arm 40 to rotate, carrying the yoke 32 with it. Since the yoke 32 is rigidly secured to the mainspring 31 at the end 31a, a variation in the torque applied to torque arm 30 by mainspring 31 is produced. It will be noted that the nulling fiber 43 is aligned with the axle 46 and the hinges 47 and 48. Rotation of the crank arm 44 is produced by a variation in the torque transmitted through the fiber 43.

The systems illustrated in FIGURES 1 and 3 are to be housed in a pressure-tight chamber of the type and in the manner well-known in the art. The housing H has been indicated diagrammatically by the use of the dotted outline which encloses the suspension and on which the suspension optics and control are to be mounted. Preferably, the temperature of the enclosure will be controlled. Insofar as the temperature is not maintained constant, the embodiment of FIGURE 3 provides for compensation of variations heretofore troublesome in conventional suspensions. Such compensation is achieved without the inherent time lag characterizing prior art systems.

Figure 5:
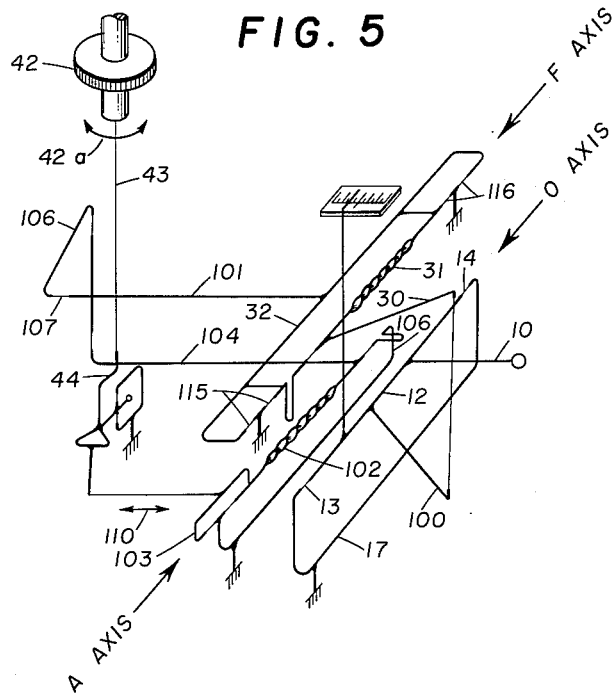
FIGURE 5 illustrates a preferred embodiment of the invention.

FIGURE 5 is an isometric schematic representation of another embodiment of the present invention. In this embodiment, there not only is temperature compensation provided, by inclusion of a gas-filled mainspring 31, but also there is included a linearizing compensator in the form of a gas-filled twisted spring 102 which is included in the nulling linkage. For the purpose of simplicity, the main frame has been omitted with the points of coupling thereto being indicated diagrammatically and like parts having been given the same reference characters as in FIGURES 1 and 3.

Weight arm 10 is supported horizontally from the axle 12. The hinges 13 and 14 permit rotation of arm 10 with reference to the main frame 17. In this embodiment, a bar 100 is secured to the axle 12 and extends downwardly and to the right therefrom at an angle of about 45°. Torque arm 30 is secured to the end of the mainspring 31 in the same manner as above described in connection with FIGURE 3.

Yoke 32 is controlled by a horizontally-extending arm 101. Also provided is a linearizing compensator fiber 102. The linearizing compensator fiber 102 is a hollow twisted torsion fiber which is secured at one end to a secondary yoke 103. The other end is secured to an arm 104 and is hinged to a yoke 106 which is secured to the main frame.

The linkage in the system of FIGURE 5 is diagrammatically illustrated in FIGURE 6 which is an end view of the system with certain parts omitted for the purpose of simplicity. The axle 12 is located at the "O" axis. The mainspring 31 is located at the "F" axis. The linearizing compensator 102 is located at the "A" axis. The yoke 103 is coupled to the compensator 102. When a force is applied to yoke 103 in the direction of arrow 112, the arm 104 is rotated about the "A" axis in a counterclockwise direction. Arm 104 is hinged at point 107 to a link 108. Link 108 is hinged at point 109 to a link 110. The link 110 is hinged at point 111 to the arm 101 which is coupled to the yoke 32. When a nulling force is applied to the yoke 103 as along the arrow 112, the arm 104 is rotated in a counterclockwise direction to cause the entire linkage leading from yoke 103 to the "F" axis to be changed as shown by the dotted outline of FIGURE 6. The arm 108 moves downwardly and to the right. The hinge point 109 similarly moves downwardly so that the arm 110 is rotated clockwise, applying a force to arm 101 to move it downwardly, thus tending to rotate the torque arm 30 in a counterclockwise direction. Because of the presence of the hinges at points 107, 109, and 111 and the initial geometry of the arms 104, 108, 110 and 101, the displacement c of the upper end of arm 108 is substantially greater than the displacement d of the end of arm 101. The restoring force from the yoke 103 is applied to arm 104 by way of the linearizing compensator 102. The linearizing compensator 102 is filled with dry gas in a manner similar to fiber 31 and is maintained in a housing (not shown) such that there is a predetermined pressure differential between the atmosphere outside the elements 31 and 102 and the pressure inside the elements. When the mainspring 31 becomes hotter, it becomes stronger. The same is true of the linearizing compensator 102. Increase in the strength of spring 31 causes weight arm 10 to move upward. However, as the gas in mainspring 31 becomes hotter, the increased pressure inside causes it to rotate in direction as to unwind and cancel any movement of weight arm 10 that otherwise would take place by reason of the increase in strength or spring stiffness. Ideally upon change of temperature, with compensation as provided herein, there will be no displacement of arm 10.

The purpose of spring 102 will be apparent when it is understood that the volume of mainspring 31 does not remain constant with changes in temperature. It varies non-linearly with pressure to the extent that resulting compensation in mainspring 31 has been found to be not exactly proportional to changes in temperature. Action of the mainspring is modified by the linearizing compensator 102. The mainspring-compensator combination of elements 31 and 102 may be considered to be an integrated compensator system in which the mainspring 31 is the principal component supplying the counteracting torque to the torque arm 30. The torque introduced by mainspring 31 is non-linear. The linearizing compensator 102 operates opposite to mainspring 31 but does so in a decreasingly effective manner. Rotation to depress arm 104 causes the arm 110 to move to the right as viewed in FIGURES 5 and 6. Such movement decreases the effective length and the resulting torque applied to the arm 101 which, in turn, controls the position of yoke 32.

The linkage from the nulling konb 42 through the fiber 43 and the crank 44 transmits the nulling torque by means of the yoke 103 in a manner completely independent of the torque from the linearizing compensator 102. The torque transmitted by the compensator 102 back through the yoke 103, due to changes in temperature of the compensator 102, is significant as compared with the nulling torque transmitted from fiber 43.

It is to be understood that the nulling linkage and the linearizing compensating linkage can be made physically independent although in the preferred embodiment shown in FIGURE 5, the null torque is transmitted through the linearizing compensator.

The systems illustrated for support of a weight which is subject to the influence of acceleration forces such as gravity, have been found to be rugged. They are able to withstand abuse beyond the limits characterizing suspensions of comparable sensitivity known in the prior art. This is due largely to the elimination of helical springs which change dimension by elongation in direction of their axes. In each of the embodiments herein described, the mainspring is characterized by a torsion member having symmetry to the points at which the torsion member is connected to the yoke 32 and to the torque arm 30. It is to be noted that in the system of FIGURES 3 and 5, the mainspring is a twisted fiber. In FIGURE 7, a modified form of temperature compensating mainspring is illustrated. More particularly, a helical mainspring 150 is illustrated in place of the twisted mainspring 31 of FIGURE 3. Spring 150 is mounted in the yoke 32 with hinge 35 serving to connect the yoke 32 to the main frame 17. The torque arm 30 is coupled to the end of the mainspring 150 opposite the hinge 35. Hinge 33 leads to the yoke 32, the hinge 34 providing support from the main frame 17. The mainspring 150 in this embodiment is formed from a hollow, flat quartz fiber which is gas-filled so that as the spring becomes hotter and increases its strength, the gas therein expands, tending to unwind the spring to compensate for the change in the strength of the spring. In operation, the spring merely tends to unwind or to be wound tighter but does not change dimension axially. The spring 150 is mounted with its axis corresponding to the axis of the hinges 33–35 so that axial elongation is not permitted. If desired, a hinged rod may be provided extending through the spring 150 to provide rigidity to the axis of the spring. It is to be noted, however, that the hollow twisted fiber of FIGURES 3 and 5 is preferred over the helical mainspring of FIGURE 7 because comparatively it is more rugged.

Having described the invention in connection with specific embodiments, it is to be understood that modifications may be made therein without departing from the spirit and scope of the invention as set forth in the appended claims. Weight arm 10 has been described as extending horizontally and perpendicularly from the axle 12. It is possible and it may be desirable in some instances to change this specific relationship. An optical readout system has been illustrated because of its simplicity; however, it may be replaced by electric readout systems as well-known in the art. Reference has been made to hinges which are frictionless and of low torque. The hinges characterizing the supports of the elements in the various embodiments described above are formed as integral parts of the quartz elements. For example, the hinges 13 and 14 supporting axle 12 are formed by locally heating the axle stock and applying tension thereto while heated to neck the quartz rod down to a fine filament. The filaments from hinges 13 and 14, which will support axle 12 from standards 15 and 16 while permitting substantially unlimited rotation without friction and practically no torque. The foregoing characterize this construction within the range of displacement permitted. As is well-known, stops are provided to limit the displacements to angles of about 1° of rotation of the weight arm 10.

The embodiments above described have been characterized as formed from fused quartz. It will be recognized that materials other than quartz may be employed in suspension illustrated herein. Quartz, however, has been selected for the purpose of this description and has been employed in actual practice because of its favorable physical characteristics. Further, by way of example only, the relative dimension lengths illustrated in FIGURES 1 and 3 are representative of actual embodiments of the invention that have been constructed where the entire system is placed within a housing having dimensions of the order of one or two inches. While the suspension has the appearance of being fragile, it has been found to be capable of withstanding high accelerations and shock without damage due to the light weight thereof.

It is intended to cover such modifications of the invention as fall within the scope of the appended claims.

What is claimed is:

1. In a suspension for a weight responsive to acceleration forces, the combination which comprises:
   (a) a spring having a closed gas-filled chamber therein, said gas compensating for changes in the spring in response to changes in temperature,
   (b) spaced hinges supporting said spring at its axis for differential rotation of the ends of said spring,
   (c) a torque arm secured to said spring intermediate said hinges,
   (d) means for linking said weight to said torque arm at a point spaced from the juncture between said spring and said torque arm, and
   (e) means coupled to said spring at a point spaced from the said juncture for varying the torque applied to said weight through said spring.

2. In a suspension for a weight responsive to acceleration forces, the combination which comprises:
   (a) an elongated twisted hollow tube of rectangular cross section having a closed gas-filled chamber therein, said gas compensating for changes in said twisted hollow tube in response to changes in temperature,
   (b) spaced hinges supporting said tube at the twist axis for differential rotation of the ends of said tube on said axis,
   (c) a torque arm secured to said tube intermediate said hinges,
   (d) means for linking said weight to said torque arm at a point spaced from the juncture between said tube and said torque arm, and (e) means coupled to said tube at a point spaced from the said juncture for varying the torque applied to said weight through said tube.

3. A gravity meter suspension which comprises:
(a) a horizontal main axle supported for substantially free rotation at a first axis,
(b) a weight arm extending normally horizontally from said main axle,
(c) a resilient torsion member supported for differential rotation of the ends thereof on a second axis above and parallel to said first axis on the side thereof opposite said weight arm,
(d) a torque arm secured to said torsion member at a point spaced from one end thereof and extending upwardly and toward a vertical plane which includes said first axis,
(e) a flexible filament interconnecting said weight arm and said torque arm at points spaced predetermined distances from said first axis and said second axis, respectively, and
(f) means connected to said torsion member at a point in the region of said one end for control of the position of said weight arm by torque transmitted by said torsion member to said torque arm.

4. The combination set forth in claim 3 in which said torque arm is of length about equal to the spacing between said first axis and said second axis.

5. A gravity meter suspension which comprises:
(a) a horizontal main axle supported for substantially free rotation at a first axis,
(b) a weight arm extending normally horizontally from said main axle,
(c) a resilient twisted fiber having a closed gas-filled chamber therein to compensate for changes in length of said fiber in response to changes in temperature, said resilient twisted fiber being supported for differential rotation of the ends thereof on a second axis above and parallel to said first axis on the side thereof opposite said weight arm,
(d) a torque arm secured to said fiber at a point spaced from one end thereof and extending upwardly and toward a vertical plane which includes said first axis,
(e) a flexible filament interconnecting said weight arm and said torque arm at points spaced predetermined distances from said first axis and said second axis, respectively, and
(f) means connected to said fiber at a point in the region of said one end for control of the position of said weight arm by torque transmitted through said fiber.

6. In a gravity meter, a suspension which comprises:
(a) a torsion member extending along a first axis which is substantially horizontal and supported at the ends thereof by filamentary extensions of said torsion member,
(b) a torque arm mounted on said torsion member and extending transversely therefrom,
(c) a main axle resiliently supported for rotation on a second horizontal axis spaced from said first axis,
(d) a weight arm mounted on said main axle and extending transversely therefrom,
(e) a flexible filament interconnecting said torque arm and said weight arm,
(f) a main lever connected to said torsion member at a point spaced from said torque arm,
(g) a control linkage leading to said main lever which includes:
    (1) a crank supported for rotation about a third axis perpendicular to and spaced from said first axis,
    (2) an input element mounted at a point spaced from said crank for rotational adjustment relative to said third axis,
    (3) a torsion filament extending along said third axis interconnecting said input element and said crank for applying rotational force to said crank by rotation of said input element, and
    (4) transmission means including a flexible filament extending from said crank to said main lever for transmitting force from said torsion filament to said torsion member for control of the position of said weight arm.

7. The combination set forth in claim 6 in which said transmission means includes:
(i) a secondary torsion member which is substantially horizontal and axially supported at the ends thereof by an anchored filamentary extension thereof and having spaced transfer levers extending therefrom,
(ii) an intermediate linkage extending from one of said transfer levers to said main lever, and
(iii) a flexible filament connected between said crank and the second of said transfer levers.

8. In a gravity meter, a suspension which comprises:
(a) a main quartz torsion member having a twisted hollow gas-filled intermediate portion extending along a first axis which is substantially horizontal and supported at the ends thereof by filamentary extensions of said torsion member,
(b) a torque arm mounted on said main torsion member adjacent to one end of said intermediate portion and extending transversely therefrom,
(c) a main axle resiliently supported for rotation on a second horizontal axis spaced from said first axis,
(d) a weight arm mounted on said main axle and extending transversely therefrom,
(e) a flexible filament interconnecting said torque arm and said weight arm,
(f) a main lever connected to said main torsion member adjacent to the other end of said intermediate portion,
(g) a control linkage leading to said main lever which includes:
    (1) a crank supported for rotation about a third axis perpendicular to and spaced from said first axis,
    (2) an input element mounted at a pointed spaced from said crank for rotational adjustment relative to said third axis,
    (3) a torsion filament extending along said third axis interconnecting said input element and said crank for applying rotational force to said crank by rotation of said input element,
    (4) a linkage extending from said crank to said main lever including:
        (i) a secondary torsion member which is substantially horizontal and supported at the ends thereof by an anchored filamentary extension thereof and having spaced transfer levers, one of which extends parallel to said main lever,
        (ii) an intermediate resilient linkage extending from said one of said transfer levers to said main lever, and
        (iii) a flexible filament connected between said crank and the other of said transfer levers.

9. The combination set forth in claim 8 in which said secondary torsion member has a twisted hollow gas-filled central portion to rotate said one of said transfer levers upon change in pressure of the gas therein to compensate for the change in volume of gas in said main torsion member upon change in temperature thereof.

10. An adjustable resilient support for a member which comprises:
(a) an elongated rod lying along a first axis which is substantially horizontal and supported at at least one end thereof on an anchored filamentary extension of said rod,
(b) an arm mounted on said rod and extending transversely therefrom, (c) a flexible filament secured to said arm at a point spaced from said rod and connected at the opposite end thereof to said member,
(d) control means coupled to said rod at a point remote from said arm,
(e) a crank means supported for rotation about a second axis spaced from said control means,
(f) a flexible fiber connecting said control means to said crank means, and
(g) a torsion fiber coupled to said crank means and supported in alignment with said second axis for application to said crank means of rotational forces through said torsion fiber to produce rotation of said rod.

11. An adjustable resilient support for a member which comprises:
(a) an elongated rod lying along an axis which is substantially horizonal and supported at one end thereof on an anchored filamentary extension of said rod;
(b) an arm mounted on said rod and extending transversely therefrom;
(c) a flexible filament secured to said arm at a point spaced from said rod and connected at the opposite end thereof to said member, and
(d) control means coupled to said rod at a point remote from said arm for applying a rotational force to said rod which is transmitted as a torsional force by said rod to said arm, said rod being a hollow, twisted tubular structure in at least a portion of the section between said arm and said control means and filled with a dry gas at a pressure differing from the pressure outside said rod, said gas compensating for changes in the said rod in response to changes in temperature.

12. A temperature-compensated resilient rotatable suspension system which comprises:
(a) a closed elongated gas-filled tube having a major lateral dimension greater than a minor lateral dimension and twisted on the longitudinal axis thereof,
(b) means for anchoring one end of said tube at said axis, and
(c) a supporting link extending from a point on said tube spaced from said one end, at which point rotation in either direction due to temperature-dependent changes in the modulus of elasticity is accompanied by untwisting in an opposite direction due to resulting PVT changes in the gas in said tube.

13. A temperature-compensated resilient rotatable suspension system which comprises:
(a) an elongated tube of fused quartz having an elongated gas-filled central chamber of rectangle-like across section, which tube is twisted on the longitudinal axis thereof,
(b) means for anchoring one end of said tube at said axis, and
(c) a supporting link extending from a point on said tube spaced from said one end, at which point rotation in either direction due to temperature-dependent changes in the modulus of elasticity is accompanied by untwisting in an opposite direction due to resulting PVT changes in the gas in said tube.

14. A gravity meter suspension which comprises:
(a) a weight;
(b) an arm for supporting said weight from a first point thereon;
(c) a hollow quartz spring mounted symmetrically relative to an axis passing transversely through said arm at a second point spaced from said first point and rigidly secured to said arm at said second point to apply a torque to said arm, said spring being sealed at the ends thereof and enclosing a dry gas at a pressure slightly in excess of the pressure of the atmosphere outside said spring, said gas compensating for changes in said rod in response to changes in temperature, and
(d) means coupled to said spring at the end thereof opposite said arm for varying said torque to control the position of said weight.

15. A gravity meter suspension which comprises:
(a) an axle hinged longitudinally for rotation about a horizonal main axis,
(b) a weight arm normally extending horizontally and perpendicularly from said axle,
(c) a supporting suspension including a yoke mounted for rotation about a horizontally-disposed secondary axis parallel to said main axis,
(d) resilient means rigidly secured at one end to said yoke and spanning said yoke at said secondary axis,
(e) a control arm extending from said secondary axis and secured to said resilient means at the end thereof opposite said one end,
(f) a physical connection between said control arm and said axle for supporting said weight arm, and
(g) means for rotating said yoke about said secondary axis to vary the torque transmitted to said control arm by way of said resilient means to control the position of said weight arm.

16. A gravity meter suspension which comprises:
(a) a main axle hinged axially for rotation about a horizontal main axis,
(b) a weight arm normally extending horizontally and perpendicularly from said main axle and a torque arm extending perpendicularly from said main axle,
(c) a second suspension including a yoke structure mounted for rotation about a horizontally-disposed secondary axis parallel to said main axis,
(d) resilient means rigidly secured at one end to said yoke and spanning said yoke at said secondary axis,
(e) a control arm extending from said secondary axis and secured to said resilient means at the end thereof opposite said one end,
(f) a filament connected between the ends of said control arm and said torque arm for opposing rotation of said main axle under the force of said weight arm, and
(g) means for rotating said yoke about said secondary axis to vary the torque transmitted to said control arm by way of said resilient means to control the position of said weight arm.

17. A gravity meter suspension which comprises:
(a) a horizontally supported axle having a weight arm extending perpendicularly therefrom and freely rotatable with said axle over a limited angle about a horizontal null position,
(b) a control suspension mounted for rotation about a control axis parallel to but spaced from said axle,
(c) a support structure in said control suspension including a control arm extending obtusely in a plane common to said control axis and which intersects the center line of said weight arm at an angle of about 45°,
(d) a supporting linkage extending from a point on said control arm spaced from said control axis to said weight arm to apply a torque to said axle which opposes the gravitational pull on said weight arm, said linkage normally extending perpendicularly from said plane, and
(e) means for applying a torque to said control arm at said control axis of selectively variable magnitude to position said weight arm at said null position.

18. In a nulling system for a gravity meter having a weight arm mounted for rotation on a first axis and mechanically coupled to a lever arm, the combination which comprises:
(a) a crank means supported for rotation about a second axis spaced from said lever arm,
(b) means including a flexible fiber connecting the end of said lever arm to said crank means, and
(c) a torsion fiber coupled to said crank means and supported in alignment with said second axis for application to said crank means of rotational forces through said torsion fiber.

19. In a nulling system for a gravity meter having a weight arm mounted for rotation on a first axis and mechanically coupled to a lever arm, the combination which comprises:
  (a) a crank supported for rotation about a second axis which is spaced from said lever arm,
  (b) means including a flexible fiber connecting the end of said lever arm to said crank,
  (c) a rotatable control mounted in spaced relation with respect to said crank for rotation on said second axis, and
  (d) a torsion fiber interconnecting said crank and said control in alignment with said second axis for application to said lever arm through said crank of rotational forces through said torsion fiber.

References Cited by the Examiner
UNITED STATES PATENTS

| | | | |
|---|---|---|---|
| 1,408,122 | 2/1922 | Mirk | 73—368.6 |
| 2,674,887 | 4/1954 | Worden | 73—382 |
| 2,732,718 | 1/1956 | Cornelison | 73—382 |
| 2,937,527 | 5/1960 | Mason et al. | 73—368.6 X |
| 3,076,340 | 2/1963 | Baker | 73—382 |

RICHARD C. QUEISSER, *Primary Examiner.*

CHARLES A. RUEHL, *Assistant Examiner.*